(12) United States Patent
Zhang et al.

(10) Patent No.: US 11,150,993 B2
(45) Date of Patent: Oct. 19, 2021

(54) METHOD, APPARATUS AND COMPUTER PROGRAM PRODUCT FOR IMPROVING INLINE PATTERN DETECTION

(71) Applicant: EMC IP Holding Company LLC, Hopkinton, MA (US)

(72) Inventors: Leihu Zhang, Beijing (CN); Xiaohua Fan, Shanghai (CN); Hao Fang, Beijing (CN); Chen Gong, Beijing (CN); Ming Zhang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 337 days.

(21) Appl. No.: 16/249,296

(22) Filed: Jan. 16, 2019

(65) Prior Publication Data
US 2019/0220363 A1 Jul. 18, 2019

(30) Foreign Application Priority Data
Jan. 18, 2018 (CN) .......................... 201810048674.7

(51) Int. Cl.
  G06F 16/00 (2019.01)
  G06F 11/14 (2006.01)
  G06F 16/14 (2019.01)
  G06F 16/13 (2019.01)

(52) U.S. Cl.
  CPC .......... *G06F 11/1448* (2013.01); *G06F 16/13* (2019.01); *G06F 16/148* (2019.01)

(58) Field of Classification Search
  None
  See application file for complete search history.

(56) References Cited

U.S. PATENT DOCUMENTS

| | | | |
|---|---|---|---|
| 6,587,919 B2 * | 7/2003 | Yanai | G06F 11/2079 711/112 |
| 8,612,382 B1 | 12/2013 | Patel et al. | |
| 8,751,763 B1 * | 6/2014 | Ramarao | G06F 16/1752 711/162 |
| 9,246,802 B2 * | 1/2016 | Angst | H04L 12/4675 |
| 9,430,503 B1 | 8/2016 | Delgado et al. | |
| 9,594,513 B1 * | 3/2017 | Delgado | G06F 16/113 |
| 9,727,479 B1 | 8/2017 | Armangau et al. | |
| 9,880,762 B1 | 1/2018 | Armangau et al. | |
| 10,037,251 B1 | 7/2018 | Bono et al. | |
| 10,050,936 B2 * | 8/2018 | Roberson | H04L 63/02 |
| 10,242,012 B1 | 3/2019 | Basov et al. | |

(Continued)

*Primary Examiner* — Jean M Corrielus
(74) *Attorney, Agent, or Firm* — BainwoodHuang (57) ABSTRACT

Computerized techniques involve dividing a plurality of entries included in an indirect block of an inode into a plurality of entry groups. Each non-null entry of the plurality of entries has one of a pointer pointing to an associated data block and an identifier specific to a byte pattern of an associated data block. The techniques further involve determining, for an entry group of the plurality of entry groups, whether entries having an identifier in the entry group all have a same predetermined identifier. The techniques further involve in response to determining that the entries having an identifier in the entry group all have the same predetermined identifier, identifying the entry group as recoverable if the indirect block is corrupted. Such techniques improve reliability and performance of a storage system.

21 Claims, 6 Drawing Sheets

(56) References Cited

U.S. PATENT DOCUMENTS

| | | |
|---|---|---|
| 10,896,152 B2 | 1/2021 | Kuang et al. |
| 10,936,227 B2 | 3/2021 | Yang et al. |
| 2017/0017571 A1* | 1/2017 | Choi .................. G06F 12/0246 |

* cited by examiner

METHOD, APPARATUS AND COMPUTER PROGRAM PRODUCT FOR IMPROVING INLINE PATTERN DETECTION

FIELD

Embodiments of the present disclosure generally relate to a computer system and a storage system, and more specifically, to a method, an apparatus and a computer program product for improving inline pattern detection.

BACKGROUND

In a block storage system, a logical unit number (LUN) is provided with a backend file system (CBFS) to manage its data blocks. The file system typically has a tree-like layout whose root is an inode which contains pointers pointing to direct blocks (i.e., data blocks) and pointers pointing to indirect blocks. The indirect blocks include pointers pointing to data blocks or pointers pointing to next level indirect blocks. All pointers here contain an associated file system block number (FSBN) of the target data block.

In the indirect blocks, leaf indirect blocks are indirect blocks at the lowest level, which include pointers pointing data blocks and whose entries can be used to implement inline pattern detection (ILPD). The inline pattern detection is a lightweight data reduction method, which can represent a pattern data block using a pattern identifier (pattern ID) in entries of the leaf indirect blocks. The so-called pattern data block used herein refers to a data block formed by a particular byte pattern.

However, if the inline pattern detection is used, there are no actual pattern data blocks and block metadata for the pattern data blocks, and thus all pattern data blocks cannot be addressed to the leaf indirect block. When the pattern identifier losses due to corruption of the leaf indirect block or other reasons, these pattern data blocks cannot be recovered. This reduces reliability and performance of the storage system.

SUMMARY

Embodiments of the present disclosure relate to a method implemented by a computer, an electronic device, and a computer program product.

In a first aspect of the present disclosure, there is provided a method implemented by a computer. The method includes dividing a plurality of entries included in (or residing within) an indirect block of an inode into a plurality of entry groups. Each non-null entry of the plurality of entries has one of a pointer pointing to an associated data block and an identifier specific to a byte pattern of an associated data block. The method also includes determining, for an entry group of the plurality of entry groups, whether entries having an identifier in the entry group all have a same predetermined identifier. The method further includes in response to determining that the entries having an identifier in the entry group all have the same predetermined identifier, identifying the entry group as recoverable if the indirect block is corrupted.

In some embodiments, dividing the plurality of entries into the plurality of entry groups may include dividing the plurality of entries equally into the plurality of entry groups each including consecutive entries of the plurality of entries.

In some embodiments, determining whether the entries having an identifier in the entry group all have the same predetermined identifier may include determining, for the entry group, a count of entries having an identifier different from the predetermined identifier, and in response to the count being zero, determining that the entries having an identifier in the entry group all have the same predetermined identifier.

In some embodiments, the method may further include in response to an entry in the entry group being updated, updating the count.

In some embodiments, updating the count may include at least one of: in response to the entry having the predetermined identifier prior to updating and having an identifier different from the predetermined identifier subsequent to updating, increasing the count; and in response to the entry having an identifier different from the predetermined identifier prior to updating and having the predetermined identifier subsequent to updating, decreasing the count.

In some embodiments, updating the count may include at least one of: in response to the count being uninitialized and the entry having an identifier different from the predetermined identifier subsequent to updating, determining the count to be non-zero; and in response to the count being uninitialized and the entry having the predetermined identifier subsequent to updating, scanning all entries in the entry group to determine the count.

In some embodiments, identifying the entry group as recoverable may include setting a bit corresponding to the entry group to a predetermined state.

In some embodiments, the bit may be stored in block metadata for the indirect block.

In some embodiments, the method may further include in response to the indirect block being corrupted and the entry group being identified as recoverable, recovering a data block corresponding to the entry group based on the byte pattern corresponding to the predetermined identifier.

In some embodiments, the predetermined identifier may correspond to a data block consisting of repeated all-zero bytes.

In a second aspect of the present disclosure, there is provided an electronic device. The device includes at least one processor and at least one memory including computer program instructions. The at least one memory and the computer program instructions are configured to, with the at least one memory, cause the device to divide a plurality of entries included in an indirect block of an inode into a plurality of entry groups. Each non-null entry of the plurality of entries has one of a pointer pointing to an associated data block and an identifier specific to a byte pattern of an associated data block. The at least one memory and the computer program instructions are also configured to, with the at least one memory, cause the device to determine, for an entry group of the plurality of entry groups, whether entries having an identifier in the entry group all have a same predetermined identifier. The at least one memory and the computer program instructions are further configured to, with the at least one memory, cause the device to in response to determining that the entries having an identifier in the entry group all have the same predetermined identifier, identify the entry group as recoverable if the indirect block is corrupted.

In some embodiments, the at least one memory and the computer program instructions may be further configured to, with the at least one processor, cause the device to divide the plurality of entries equally into the plurality of entry groups each including consecutive entries of the plurality of entries.

In some embodiments, the at least one memory and the computer program instructions may be further configured to, with the at least one processor, cause the device to determine, for the entry group, a count of entries having an identifier different from the predetermined identifier, and in response to the count being zero, determine that the entries having an identifier in the entry group all have the same predetermined identifier.

In some embodiments, the at least one memory and the computer program instructions may be further configured to, with the at least one processor, cause the device to, in response to an entry in the entry group being updated, update the count.

In some embodiments, the at least one memory and the computer program instructions may be further configured to, with the at least one processor, cause the device to, in response to the entry having the predetermined identifier prior to updating and having an identifier different from the predetermined identifier subsequent to updating, increase the count, and in response to the entry having an identifier different from the predetermined identifier prior to updating and having the predetermined identifier subsequent to updating, decrease the count.

In some embodiments, the at least one memory and the computer program instructions may be further configured to, with the at least one processor, cause the device to, in response to the count being uninitialized and the entry having an identifier different from the predetermined identifier subsequent to updating, determine the count to be non-zero, and in response to the count being uninitialized and the entry having the predetermined identifier subsequent to updating, scan all entries in the entry group to determine the count.

In some embodiments, the at least one memory and the computer program instructions may be further configured to, with the at least one processor, cause the device to set a bit corresponding to the entry group to a predetermined state.

In some embodiments, the bit may be stored in block metadata for the indirect block.

In some embodiments, the at least one memory and the computer program instructions may be further configured to, with the at least one processor, cause the device to in response to the indirect block being corrupted and the entry group being identified as recoverable, recover a data block corresponding to the entry group based on the byte pattern corresponding to the predetermined identifier.

In some embodiments, the predetermined identifier may correspond to a data block consisting of repeated all-zero bytes.

In a third aspect of the present disclosure, there is provided a computer program product. The computer program product is tangibly stored on a non-transitory computer readable medium and includes machine executable instructions. The machine executable instructions when executed cause a machine to perform steps of the method according to the first aspect.

BRIEF DESCRIPTION OF THE DRAWINGS

Through the following detailed description with reference to the accompanying drawings, the above and other objectives, features and advantages of example embodiments of the present disclosure will become more apparent. Several example embodiments of the present disclosure will be illustrated by way of example but not limitation in the drawings in which.

Throughout the drawings, the same or similar reference symbols refer to the same or similar elements.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles and spirits of example embodiments disclosed herein will now be described with reference to various example embodiments illustrated in the drawings. It should be appreciated that description of those embodiments is merely to enable those skilled in the art to better understand and further implement the present disclosure and is not intended for limiting the scope disclosed herein in any manner.

Figure 1:
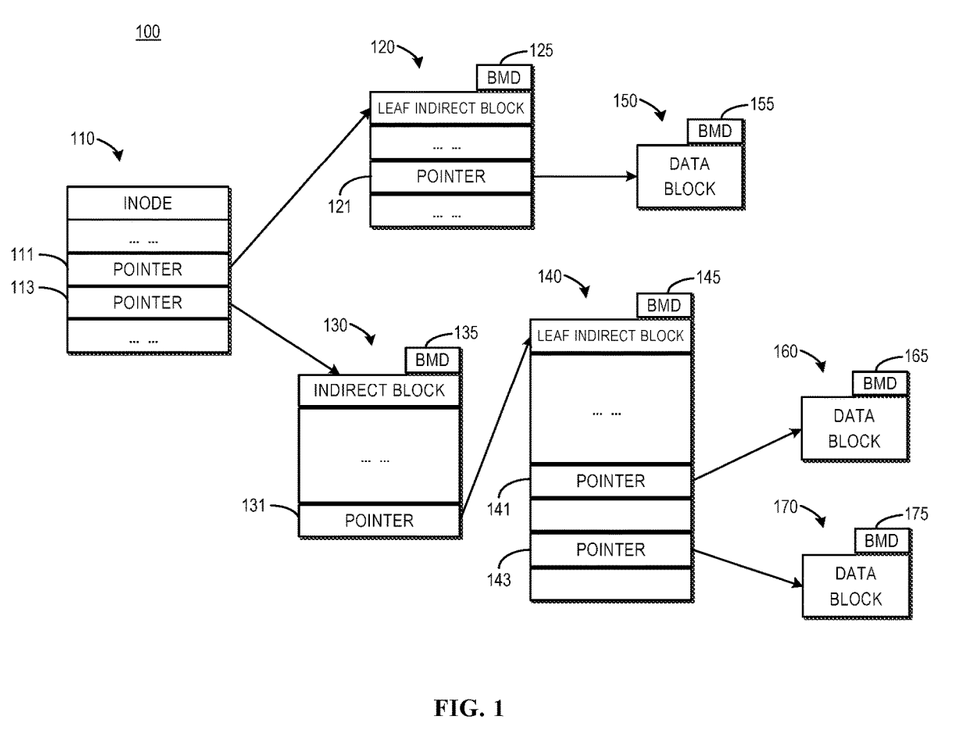
FIG. 1 illustrates a diagram of a storage system including an inode, indirect blocks and data blocks.

FIG. 1 illustrates a diagram of a storage system 100 including an inode 110, indirect blocks 120, 130 and 140, and data blocks 150, 160 and 170. As shown in FIG. 1, in a file system of the storage system 100, the inode 110 may include a pointer 111 and a pointer 113. The pointer 111 points to the indirect block 120, and the pointer 113 points to the indirect block 130. As shown, the indirect block 120 is a leaf indirect block, namely an indirect block at the lowest level, which includes a pointer 121 pointing to the data block 150. In general, the indirect blocks 120, 130 and 140 are metadata for the file system of the storage system 100, and the data blocks 150, 160 and 170 store user data.

It should be appreciated that, although not shown in FIG. 1, the inode 110 may also include a pointer directly pointing to a direct block (i.e., a data block), in addition to the pointers pointing to the indirect blocks. Further, the indirect block 130 includes a pointer 131 which points to the indirect block 140 at a next level. The indirect block 140 is also a leaf indirect block, which includes a pointer 141 and a pointer 143 pointing to the data block 160 and the data block 170, respectively.

As depicted in FIG. 1, the indirect blocks 120, 130, 140 and the data blocks 150, 160, 170 have associated block metadata (BMD) 125, 135, 145, 155, 165, 175, respectively. The block metadata store inode information, file offset information, cyclic redundancy check (CRC) information, allocation state information and the like. A child direct block and a child indirect block can be addressed to an associated parent indirect block using the inode information, the file offset information and the like in the block metadata, and thus a logical association between the child indirect block and the parent indirect block may be rebuilt if an entry (a pointer) of the parent indirect block is corrupted.

As mentioned above, the entries of an indirect block (particularly a leaf indirect block) may be used to implement inline pattern detection (ILPD). The inline pattern detection is an effective lightweight data reduction method like deduplication/compression, which may represent a pattern data block with a pattern identifier in the entries of the indirect block. The so-called pattern data block refers to a data block consisting of a particular byte pattern, for example a data block consisting of repeated pattern bytes 0x0, 0x1, . . . , 0xFF, and the like.

That is, all entries of an indirect block pointing to a pattern data block include a pattern identifier, rather than the file block numbers of the child blocks (data blocks). With the inline pattern detection, the data blocks actually stored in the storage space can be reduced, and it is only required to add an identifier to the metadata for the storage blocks (indirect blocks) to represent the data blocks consisting of repeated byte patterns.

However, in case that the inline pattern detection is used, there are no actual pattern data blocks and block metadata for the pattern data blocks, and thus all pattern data blocks cannot be addressed to an indirect block using the existing recovery technology. If the indirect blocks are corrupted or the pattern identifier is lost, these pattern data blocks cannot be recovered, which reduces reliability and performance of the storage system.

In light of the above problem and other potential problems of existing storage systems, embodiments of the present disclosure provide a method implemented by a computer, an electronic device and a computer program product. The basic idea is using a bitmap with a limited number of bits to indicate whether entries of an indirect block include a same predetermined identifier. The limited number of bits may be much smaller than the number of entries of an indirect block (for example, the number typically may be 1024). If a plurality of entries of the indirect block have the same predetermined identifier, the data blocks corresponding to these entries can be recovered if the indirect block is corrupted, thereby improving reliability of the storage system when the inline pattern detection is used.

In addition, the embodiments of the present disclosure further provide a counter group corresponding to each entry group for tracking a number of entries having a non-predetermined identifier in the entry group, such that a count of the counter may be updated accordingly when an entry is updated, and thus avoiding scanning all the entries to updating the number of entries having a non-predetermined identifier each time an entry is updated. The embodiments of the present disclosure will be described in detail with reference to FIGS. 2 to 6.

Figure 2:
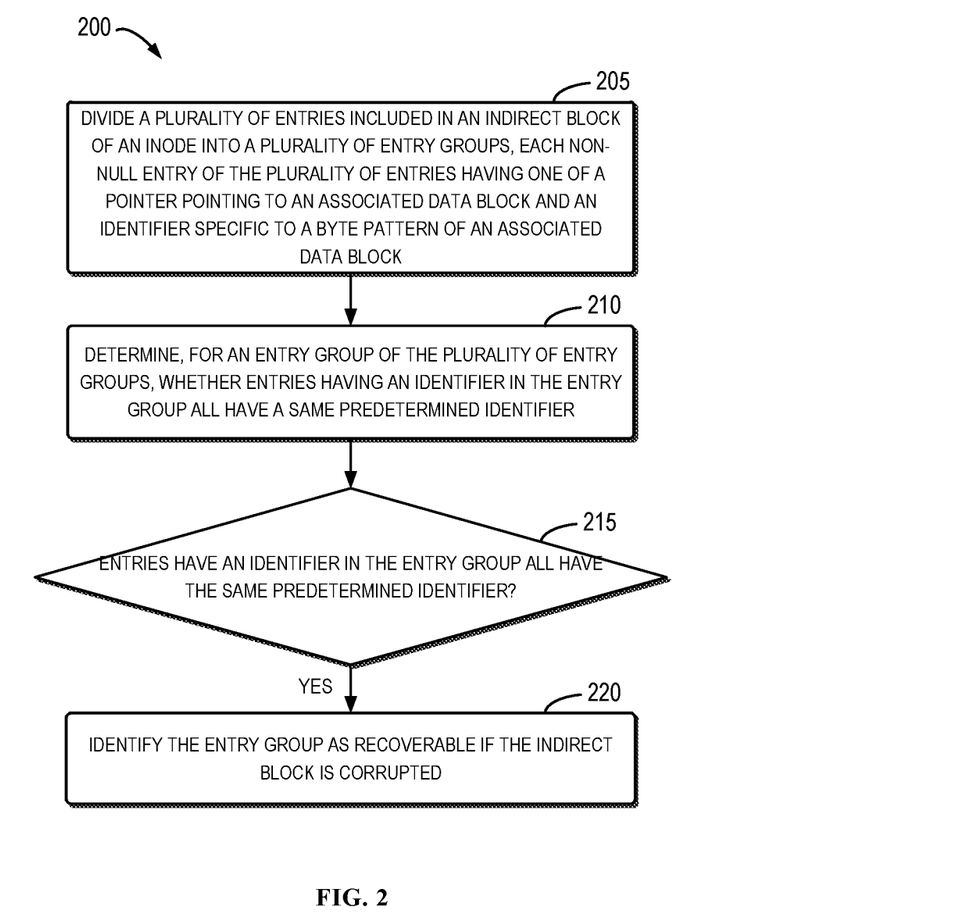
FIG. 2 illustrates an example flowchart of a method for a storage system according to embodiments of the present disclosure.

FIG. 2 illustrates an example flowchart of a method 200 for a storage system according to embodiments of the present disclosure. In some embodiments, the method 200 can be implemented by the storage system 100, for example can be implemented by a controller or a control unit of the storage system 100. In other embodiments, the method 200 can be implemented by a computing device independent of the storage system 100. For ease of discussion, the method 200 will be discussed in combination of FIG. 1.

Figure 3:
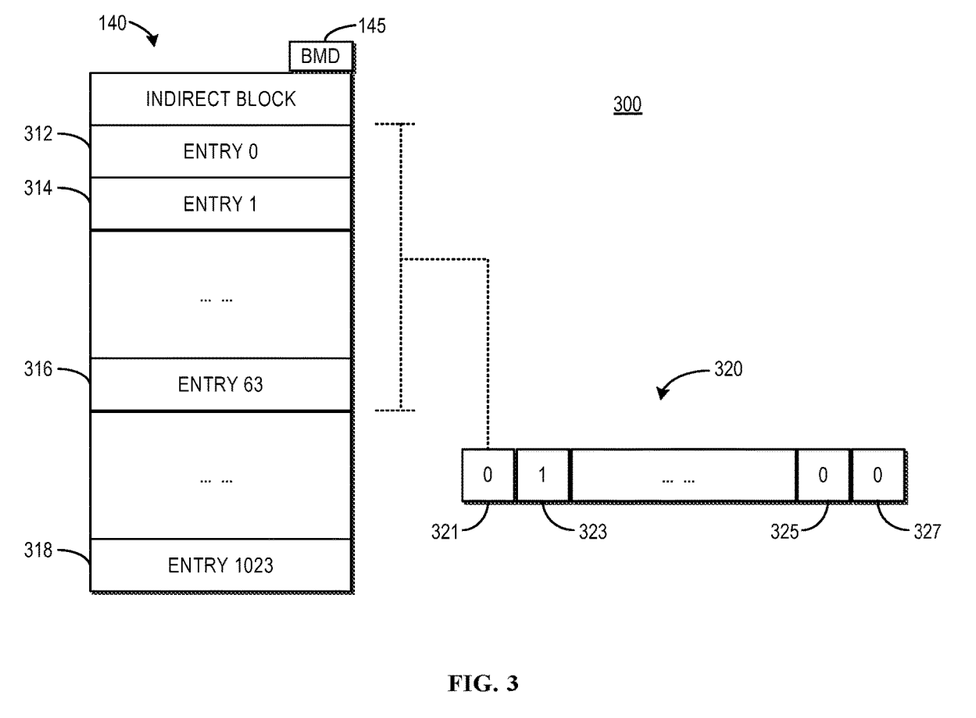
FIG. 3 illustrates a diagram of an indirect block and an associated bitmap according to embodiments of the present disclosure.

Specifically, the indirect block 140 of the inode 110 of the storage system 100 will be used as an example of an indirect block for discussion in the following. For ease of discussion, the description will be made further referring to FIG. 3 which depicts more details of the indirect block 140. FIG. 3 illustrates a diagram of the indirect block 140 and an associated bitmap 320 according to embodiments of the present disclosure.

As shown in FIG. 3, the indirect block 140 may include 1024 entries, i.e., entries 0 to 1023. In the figure, 312 denotes an entry numbered with 0, 314 denotes an entry numbered with 1, 316 denotes an entry numbered with 63, and 318 denotes an entry numbered with 1023. As mentioned above, some of the entries 0 to 1023 may be pointers pointing to the associated data blocks. Moreover, if the inline pattern detection is used, some of the entries 0 to 1023 may be identifiers specific to byte patterns of the associated data blocks. For example, an identifier specific to an all-zero byte pattern of an all-zero data block is 0. If not used, some of the entries 0 to 1023 may be null entries.

It should be appreciated that, although FIG. 3 depicts that the indirect block 140 has a specific number (i.e., 1024) of entries, the specific number is only an example, with no intention of limiting the embodiments of the present disclosure in any manner. In other embodiments, the indirect block 140 may include a different number of entries.

As shown, the indirect block 140 may also has associated block metadata 145, which stores information of the inode 110, file offset information, cyclic redundancy check (CRC) information, allocation state information and the like, associated with the indirect block 140. FIG. 3 further depicts a bitmap 320 according to the embodiments of the present disclosure, including a plurality of bits 321, 323, 325, 327 and the like, each of which is associated with a plurality of entries of the indirect block 140. In some embodiments, the bitmap 320 may be stored in block metadata 146 for the indirect block 140. Corresponding relations between the bitmap 320 and the entries 0 to 1023 of the indirect block 140 and its values will be described in detail hereinafter.

Still referring to FIG. 2, at 205, the storage system 100 divides a plurality of entries (for example, entries 0 to 1023) included in (or stored within) the indirect block 140 of the inode 110 into a plurality of entry groups. For example, for the indirect block 140 having 1024 entries as shown in FIG. 3, the storage system 100 may divide the entries 0 to 1023 equally into 16 entry groups including consecutive entries, each of which includes 64 consecutive entries. In the following, the entry group of entries 0 to 63 will be used as an example for discussion. It should be appreciated that the division of entry groups is only an example, with no intention of limiting the embodiments of the present disclosure. In other embodiments, there may be other manners for dividing the entries 0 to 1023 into entry groups.

At 210, the storage system 100 may determine, for an entry group (for example, entries 0 to 63) in the plurality of entry groups, whether entries having an identifier in the entry group all have a same predetermined identifier. It is noted that, in an actual storage system, a considerable proportion of data blocks are all-zero data blocks. Therefore, in some embodiments, the predetermined identifier may correspond to an all-zero data block consisting of repeated all-zero bytes. For example, the predetermined identifier may be an identifier of 0 representing an all-zero data block.

In this circumstance, the storage system 100 can determine whether the entries having an identifier in the entry group (for example, entries 0 to 63) all have the identifier of 0.

The embodiments of the present disclosure will be described below with an example in which the identifier of 0 serves as the predetermined identifier. However, those skilled in the art should appreciate that, in other embodiments, the predetermined identifier may be other identifier corresponding to a data block having another byte pattern, for example, an identifier of 1 representing an all-one data block, and the like. In an actual storage system, the number of identifiers can be as high as 60,000.

In some embodiments, in order to determine whether the entries having an identifier in the entry group all have the same predetermined identifier (for example, the identifier of 0), a plurality of counters may be provided, each of which associated with one entry group. The plurality of counters form a counter group. The counter group (for example, a runtime memory counter array cache) is used to track the number of entries having a non-predetermined identifier in the indirect block, and thus there is no need of scanning all the entries when each individual entry is updated to re-determine the number of entries having a non-predetermined identifier, thereby avoiding additional computing overhead. This will be specifically described below with reference to FIG. 4.

Figure 4:
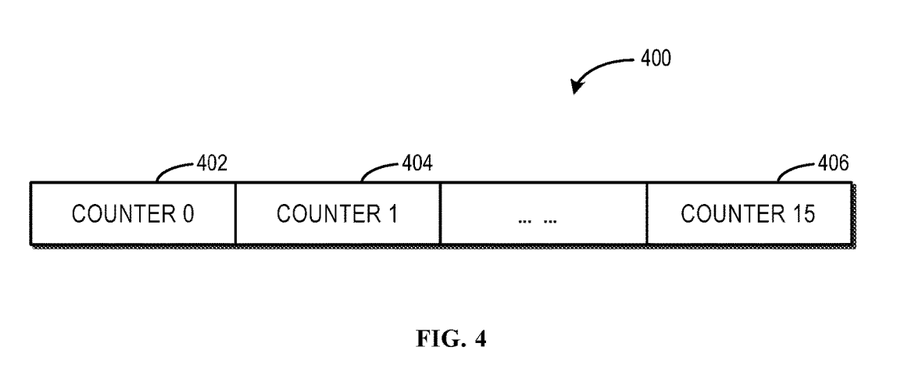
FIG. 4 illustrates a diagram of a counter group according to embodiments of the present disclosure.

FIG. 4 illustrates a diagram of a counter group 400 according to embodiments of the present disclosure. As shown, the counter group 400 includes a counter 0 denoted by 402, a counter 1 denoted by 404, . . . , a counter 15 denoted by 406. The counter 0 is used to count entries not having a predetermined identifier among the entries 0 to 63. For example, when the predetermined identifier is the identifier of 0, the counter 0 is used to count entries having a non-zero identifier among the entries 0 to 63. Likewise, the counter 1 may be associated with entries 64-127, the counter 15 may correspond to entries 960 to 1023, and so on. The counter 0 will be used as an example to detail related operations of the counter below, and other counters (for example, counters 1 to 15) have similar operations which are omitted herein for brevity.

It should be appreciated that, although FIG. 4 depicts a particular number (i.e., 16) of counters included in the counter group 400 and a particular corresponding relation between each counter and an entry of the indirect block 140, the particular number and corresponding relation are only examples, with no intention of limiting the scope of the embodiments of the present disclosure in any manner. In other embodiments, as the indirect block 140 has a different number of entries or a different dividing manner of entry groups, the counter group 400 may include another different number of counters and another different corresponding relation.

If the counter 0 is used, for the entry group of entries 0 to 63, the count of the counter 0 can be determined, i.e., the number of entries having a non-predetermined identifier (for example, a non-zero identifier). Because the counter 0 counts the entries not having the predetermined identifier in the entries 0 to 63, if the count of the counter 0 is zero, the storage system 100 may determine that the entries having an identifier in the entry group all have the same predetermined identifier, for example the identifier of 0.

In order to keep the count of the counter 0 accurately indicate the number of entries having a non-predetermined identifier, it is required to update the count of the counter 0 correspondingly if an entry among the entries 0 to 63 is updated. For ease of discussion, the updated entry is referred to as an entry X herein.

In some embodiments, the counter 0 may be updated based on the following principles. First, if the entry X has the predetermined identifier both before and after updating, the count of the counter 0 remains unchanged. If the entry X does not have the predetermined identifier before updating and after updating, the count of the counter 0 also remains unchanged.

Moreover, if the entry X has the predetermined identifier before updating and has an identifier different from the predetermined identifier after updating, the count of the counter 0 is increased, for example the count value is increased by 1. If the entry X has an identifier different from the predetermined identifier before updating and has the predetermined identifier after updating, the count of the counter 0 is decreased, for example the count value is decreased by 1.

In addition, if the count of the counter 0 is not initialized and the entry X has an identifier different from the predetermined identifier after updating, it is determined that the count of the counter 0 is non-zero. If the count of the counter 0 is not initialized and the entry X has the predetermined identifier after updating, the storage system 100 scans all the entries (i.e., entries 0 to 63) in the entry group to determine the count of the counter 0.

In order to illustrate advantages of the counter group 400, it is assumed that entries having the identifier of 1 among the 1024 entries of the indirect block 140 are to be updated to null entries. If the counter group 400 is not used, all the entries will be checked 1024×64 times to ensure counting accuracy of the counter group 400. If the counter group 400 is used, only 1024 (for initializing the counter group 400)+ 1024 (for normally checking each entry)=2048 times are required. Consequently, using the counter group 400 greatly reduces the computing overhead resulting from repeatedly scanning the entries not updated.

Figure 5:
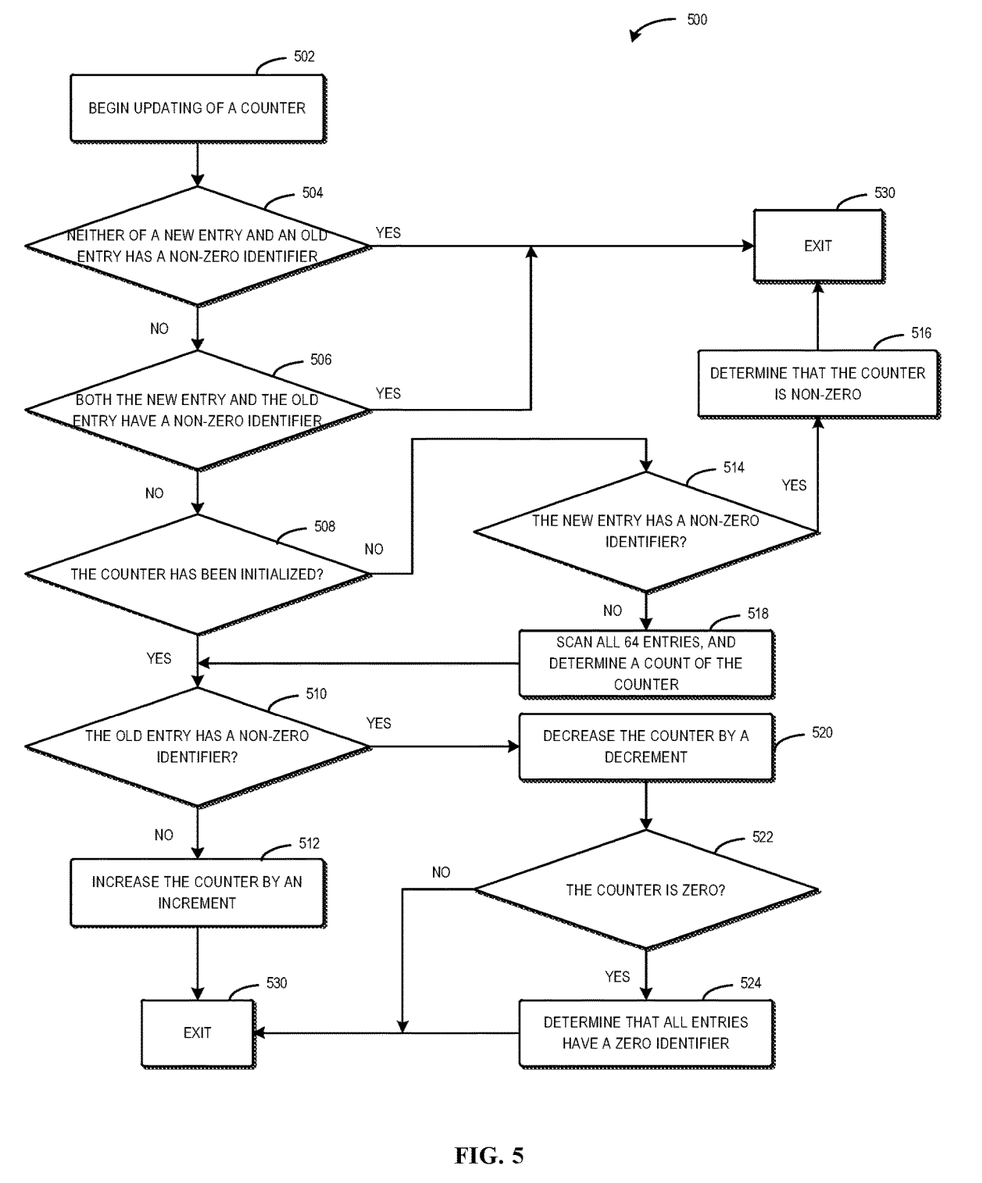
FIG. 5 illustrates an example flowchart of a method of updating a counter according to embodiments of the present disclosure.

In some embodiments, based on the above updating principles for the counter, a process of updating the counter is further provided. Referring to FIG. 5, the process will be detailed in which the counter 0 is used as an example and the identifier of 0 is used as the predetermined identifier.

FIG. 5 illustrates an example flowchart of a method 500 of updating a counter according to the embodiments of the present disclosure. In some embodiments, the method 500 may be implemented by the storage system 100, for example may be implemented by a controller or a control unit of the storage system 100. In other embodiments, the method 500 may be implemented by a computing device independent of the storage system 100. For ease of discussion, the method 500 will be discussed with reference to FIG. 1, FIG. 3 and FIG. 4, and the storage system 100 will be taken as an example to implement the method 500.

At 502, the storage system 100 may begin to update a counter (for example, the counter 0). In some circumstances, the updating may be in respond to any input and output (IO) operation for the indirect block 140. At 504, the storage system 100 determines whether the updated entry X does not have a non-zero identifier both before and after updating. If it is determined at 504 that the updated entry X does not have a non-zero identifier both before and after updating, the flow goes to block 530 for exiting. If it is determined at 504 that the updated entry X has a non-zero identifier either before updating or after updating, the flow goes to block 506.

At 506, the storage system 100 determines whether the updated entry X has a non-zero identifier both before and after updating. If it is determined at 506 that the updated entry X has a non-zero identifier both before and after updating, the flow goes to block 530 for exiting. If it is determined at 506 that the updated entry X does not have a non-zero identifier either before updating or after updating, the flow goes to block 508.

At 508, the storage system 100 determines whether the counter 0 has been initialized. If it is determined at 508 that the counter 0 has not been initialized, the flow goes to block 514. At 514, the storage system 100 determines whether the entry X has a non-zero identifier after updating. If it is determined at 514 that the entry X has a non-zero identifier after updating, the flow goes to block 516. At 516, the storage system 100 determines that the count of the counter 0 is non-zero. In other words, the storage system 100 may determine that the number of entries having a non-predetermined identifier in the entry group is non-zero, without initializing the counter 0. Then, the flow goes to block 530 for exiting. If it is determined at 514 that the entry X does not have a non-zero identifier after updating, the flow goes to block 518. At 518, the storage system 100 scans the entries 0 to 63 to determine an accurate count of the counter 0.

If it is determined at 508 that the counter 0 has been initialized, the flow goes to block 510. At 510, the storage system 100 determines whether the entry X has a non-zero identifier before updating. If it is determined to no at 510, the flow goes to block 512. At 512, the storage system 100 increases the counter 0. The flow then goes to block 530 for exiting. If it is determined at 510 that the entry X has a non-zero identifier before updating, the flow goes to block 520. At 520, the storage method 100 decreases the counter 0. Then, the flow goes to block 522.

At 522, the storage system 100 determines whether the count of the counter 0 is zero. If it is determined at 522 that the count of the counter 0 is zero, the storage system 100 determines that all the entries having an identifier among the entries 0 to 63 have the identifier of 0. Subsequently, the flow goes to block 530 for exiting. If it is determined at 522 that the count of the counter 0 is not zero, the flow goes to block 530 for exiting.

Figure 6:
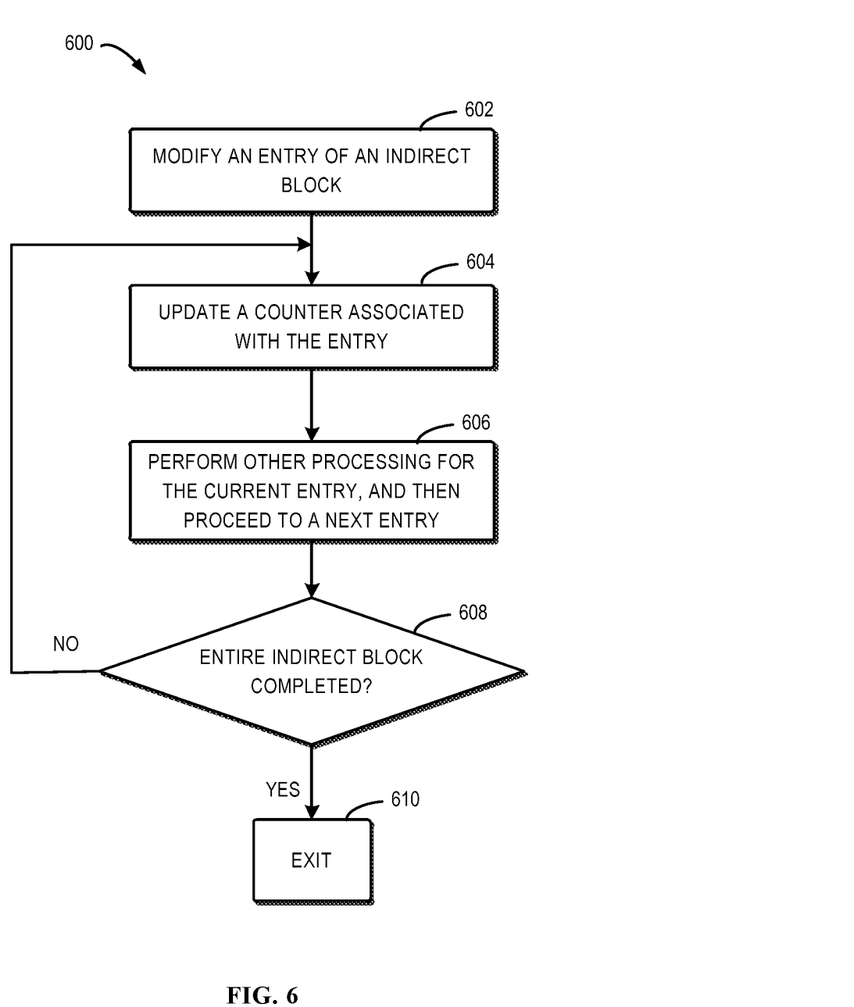
FIG. 6 illustrates an example flowchart of a method of modifying an indirect block entry according to embodiments of the present disclosure.

In addition, if a counter group 400 associated with the entry group is introduced, when one or more entries of an indirect block (for example, the indirect block 140) are modified, it is required to add an operation of updating a counter associated with the entries on the basis of the existing entry updating process. Such a variation to the operation will be described below with reference to FIG. 6. FIG. 6 illustrates an example flowchart of the method 600 of modifying entries of the indirect block 140 according to embodiments of the present disclosure.

At 602, the storage system 100 modifies an entry of the indirect block 140. At 604, the storage system 100 updates the counter associated with the modified entry. At 606, the storage system 100 performs other processing for the current entry, and then proceeds to the processing for a next entry. At 608, the storage system 100 determines whether updating of the entire indirect block is completed. If yes, the flow goes to block 610 for exiting. If no, the method 600 returns to 604 and performs updating of the next entry.

Return back to FIG. 2, at 215, the storage system 100 determines whether all the entries having an identifier in the entry group (for example, entries 0 to 63) have a same predetermined identifier (for example, the identifier of 0). In some embodiments, the determining may be based on a count of the counter 0 in the counter group 440. If the count of the counter 0 is 0, it may be determined that all the entries having an identifier in the entry group have the same predetermined identifier. On the contrary, if the count of the counter 0 is determined to be non-zero, it can be determined that the entries having an identifier in the entry group do not have the same predetermined identifier.

At 220, in response to all the entries having an identifier in the entry group (for example, entries 0 to 63) having the same predetermined identifier (for example, the identifier of 0), the storage system 100 identifies the entry group as recoverable if the indirect block 140 is corrupted. For example, in the example depicted in FIG. 3, the bit 321 corresponds to entries 0 to 63, the bit 323 corresponds to entries 64 to 127, the bit 325 corresponds to entries 896 to 959, and the bit 327 corresponds to entries 960 to 1023. If the entries having an identifier among the entries 0 to 63 all have the same predetermined identifier (for example, the identifier of 0), the bit 321 can be set to a predetermined state (for example, set to 0). Otherwise, it can be set to another state (for example, set to 1). The bits 323, 325, 327 can be set similarly, which is omitted herein for brevity.

In accordance with certain embodiments, the circuitry outputs a result indicating that the entry group is recoverable if the indirect block 140 is corrupted. Such a result may be in the form of a signal, a parameter, a value, etc.

In this way, the value of the bit 321 being 0 means that all the entries having an identifier among the entries 0 to 63 have the same predetermined identifier. In other words, the entries having an identifier among the entries 0 to 63 all represent a data block having repeated predetermined byte patterns. Therefore, when the indirect block 140 is corrupted, the data blocks having the predetermined byte patterns represented by these entries may be recovered.

It should be appreciated that, although FIG. 3 depicts specific corresponding relations between the bitmap 320 and the entries of the indirect block and specific values of the bitmap 320, these corresponding relations and values are only examples, with no intention of limiting the scope of the embodiments of the present disclosure in any manner. In other embodiments, the bits 321, 323, 325, 327 in the bitmap 320 may correspond to other entry groups of the indirect block 140, or have values different from those as shown.

In preforming data recovery after the indirect block 140 is corrupted, the storage system 100 may, in respond to the entry group being identified as recoverable, recover data blocks corresponding to the entry group based on the byte pattern corresponding to the predetermined identifier. Specifically, if the value of the bit 321 is 0, during the data recovery, all entries having the predetermined identifier are identified as a hole due to having an all-zero byte pattern. On the contrary, if the value of the bit 321 is 1, the entries 0 to 63 are identified as corrupted data blocks. In this way, although not entries of all pattern types may be recovered accurately, the storage system 100 may still recover data blocks having the predetermined pattern, for example the all-zero data blocks.

Experience demonstrates that, in an actual storage system, a remarkably high proportion (for example, even as high as 90%) of the data blocks are all-zero data blocks. Therefore, with the solution of the embodiments of the present disclosure, reliability of the indirect block can be maintained as much as possible with limited resource consumption, in a condition of supporting the inline pattern detection. Considering that the storage may benefit from a good performance and a storage space saved through the inline pattern detection, the solution according to the embodiments of the present disclosure may achieve better performance than that of the existing storage systems.

Figure 7:
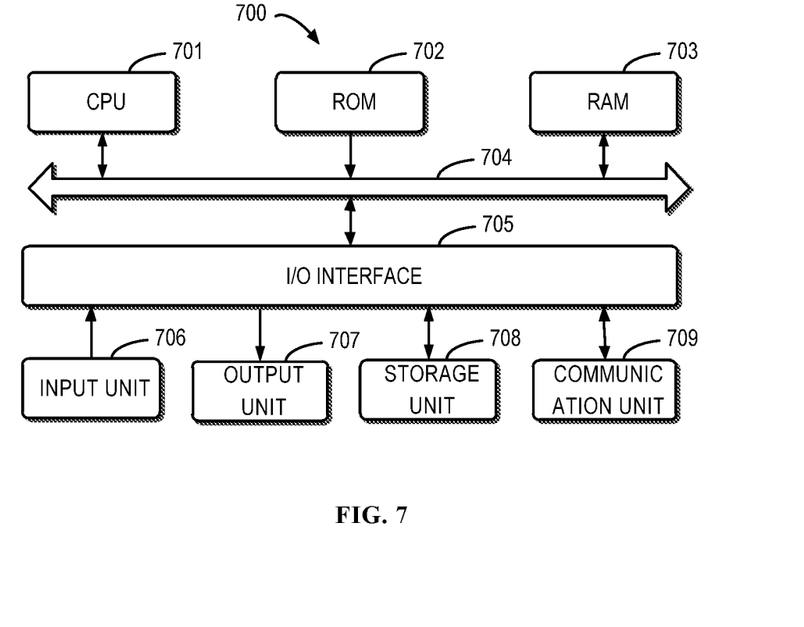
FIG. 7 illustrates an example block diagram of a device for implementing embodiments of the present disclosure.

FIG. 7 schematically illustrates a block diagram of a device 700 that can be used to implement embodiments of the present disclosure. As shown in FIG. 7, the device 700 includes a central processing unit (CPU) 701 that can perform various appropriate acts and processing based on computer program instructions stored in a read-only memory (ROM) 702 or computer program instructions loaded from a storage unit 708 to a random access memory (RAM) 703. In the RAM 703, there further store various programs and data needed for operations of the device 700. The CPU 701, ROM 702 and RAM 703 are connected to each other via a bus 704. An input/output (I/O) interface 705 is also connected to the bus 704.

The following components in the device 700 are connected to the I/O interface 705: an input unit 706, such as a keyboard, a mouse and the like; an output unit 707, such as various kinds of displays and a loudspeaker, or the like; a storage unit 708, such as a magnetic disk, an optical disk, or the like; a communication unit 709, such as a network card, a modem, and a wireless communication transceiver, or the like. The communication unit 709 allows the device 700 to exchange information/data with other devices through a computer network such as the Internet and/or various kinds of telecommunications networks.

Various processes and processing described above, e.g., the methods 200, 500 and 600, can be executed by the processing unit 701. For example, in some embodiments, the methods 200, 500 and/or 600 can be implemented as a computer software program that is tangibly embodied on a machine readable medium, e.g., the storage unit 708. In some embodiments, part or all of the computer programs can be loaded and/or mounted onto the device 700 via ROM 702 and/or communication unit 709. When the computer program is loaded to the RAM 703 and executed by the CPU 701, one or more steps of the methods 200, 500 and 600 as described above can be executed.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The terms "first," "second," and the like may refer to different or same objects. Other definitions, explicit and implicit, may be included in the context.

As used herein, the term "determining" covers various acts. For example, "determining" may include operation, calculation, process, derivation, investigation, search (for example, search through a table, a database or a further data structure), identification and the like. In addition, "determining" may include receiving (for example, receiving information), accessing (for example, accessing data in the memory) and the like. Further, "determining" may include resolving, selecting, choosing, establishing and the like.

It will be noted that the embodiments of the present disclosure can be implemented in software, hardware, or a combination thereof. The hardware part can be implemented by a special logic; the software part can be stored in a memory and executed by a suitable instruction execution system such as a microprocessor or special purpose hardware. Those skilled in the art would appreciate that the above apparatus and method may be implemented with computer executable instructions and/or in processor-controlled code, and for example, such code is provided on a carrier medium such as a programmable memory or an optical or electronic signal bearer.

Further, although operations of the method according to the present disclosure are described in a particular order in the drawings, it does not require or imply that these operations are necessarily performed according to this particular sequence, or a desired outcome can only be achieved by performing all shown operations. On the contrary, the execution order for the steps as depicted in the flowcharts may be varied. Alternatively, or in addition, some steps may be omitted, a plurality of steps may be merged into one step, or a step may be divided into a plurality of steps for execution. It will also be noted that the features and functions of two or more units of the present disclosure may be embodied in one apparatus. In turn, the features and functions of one unit described above may be further embodied in more units.

Although the present disclosure has been described with reference to various embodiments, it should be understood that the present disclosure is not limited to the disclosed embodiments. The present disclosure is intended to cover various modifications and equivalent arrangements included in the spirit and scope of the appended claims.

The invention claimed is:

1. A method implemented by a computer, comprising:
dividing a plurality of entries included in an indirect block of an inode into a plurality of entry groups, each non-null entry of the plurality of entries having one of:
a pointer pointing to an associated data block, and
an identifier specific to a byte pattern of an associated data block;
determining, for an entry group of the plurality of entry groups, whether entries having an identifier in the entry group all have a same predetermined identifier;
in response to determining that the entries having an identifier in the entry group all have the same predetermined identifier, identifying the entry group as recoverable if the indirect block is corrupted; and
in response to an entry in the entry group being updated, updating a count of entries having an identifier different from the predetermined identifier, wherein updating the count comprises at least one of:
in response to the entry having the predetermined identifier prior to updating and having an identifier different from the predetermined identifier subsequent to updating, increasing the count; and
in response to the entry having an identifier different from the predetermined identifier prior to updating and having the predetermined identifier subsequent to updating, decreasing the count.

2. The method of claim 1, wherein dividing the plurality of entries into the plurality of entry groups comprises:
dividing the plurality of entries equally into the plurality of entry groups each comprising consecutive entries of the plurality of entries.

3. The method of claim 1, wherein determining whether the entries having an identifier in the entry group all have the same predetermined identifier comprises:
determining, for the entry group, the count of entries; and
in response to the count being zero, determining that the entries having an identifier in the entry group all have the same predetermined identifier.

4. The method of claim 1, wherein identifying the entry group as recoverable comprises:
setting a bit corresponding to the entry group to a predetermined state.

5. The method of claim 4, wherein the bit is stored in block metadata for the indirect block.

6. The method of claim 1, further comprising:
in response to the indirect block being corrupted and the entry group being identified as recoverable, recovering a data block corresponding to the entry group based on the byte pattern corresponding to the predetermined identifier.

7. The method of claim 1, wherein the predetermined identifier corresponds to a data block consisting of repeated all-zero bytes.

8. A method implemented by a computer, comprising:
dividing a plurality of entries included in an indirect block of an inode into a plurality of entry groups, each non-null entry of the plurality of entries having one of:
   a pointer pointing to an associated data block, and
   an identifier specific to a byte pattern of an associated data block;
determining, for an entry group of the plurality of entry groups, whether entries having an identifier in the entry group all have a same predetermined identifier;
in response to determining that the entries having an identifier in the entry group all have the same predetermined identifier, identifying the entry group as recoverable if the indirect block is corrupted; and
in response to an entry in the entry group being updated, updating a count of entries having an identifier different from the predetermined identifier, wherein updating the count comprises at least one of:
   in response to the count being uninitialized and the entry having an identifier different from the predetermined identifier subsequent to updating, determining the count to be non-zero; and
   in response to the count being uninitialized and the entry having the predetermined identifier subsequent to updating, scanning all entries in the entry group to determine the count.

9. An electronic device, comprising:
at least one processor; and
at least one memory comprising computer program instructions, the at least one memory and the computer program instructions configured to, with the at least one memory, cause the device to:
   divide a plurality of entries included in an indirect block of an inode into a plurality of entry groups, each non-null entry of the plurality of entries having one of:
      a pointer pointing to an associated data block, and
      an identifier specific to a byte pattern of an associated data block;
   determine, for an entry group of the plurality of entry groups, whether entries having an identifier in the entry group all have a same predetermined identifier; and
   in response to determining that the entries having an identifier in the entry group all have the same predetermined identifier, identify the entry group as recoverable if the indirect block is corrupted;
wherein the at least one memory and the computer program instructions are further configured to, with the at least one processor, cause the device to:
   in response to an entry in the entry group being updated, update a count of entries having an identifier different from the predetermined identifier;
wherein the at least one memory and the computer program instructions are further configured to, with the at least one processor, cause the device to:
   in response to the entry having the predetermined identifier prior to updating and having an identifier different from the predetermined identifier subsequent to updating, increase the count; and
   in response to the entry having an identifier different from the predetermined identifier prior to updating and having the predetermined identifier subsequent to updating, decrease the count.

10. The device of claim 9, wherein the at least one memory and the computer program instructions are further configured to, with the at least one processor, cause the device to:
   divide the plurality of entries equally into the plurality of entry groups each comprising consecutive entries of the plurality of entries.

11. The device of claim 9, wherein the at least one memory and the computer program instructions are further configured to, with the at least one processor, cause the device to:
   determine, for the entry group, the count of entries; and
   in response to the count being zero, determine that the entries having an identifier in the entry group all have the same predetermined identifier.

12. The device of claim 9, wherein the at least one memory and the computer program instructions are further configured to, with the at least one processor, cause the device to:
   set a bit corresponding to the entry group to a predetermined state.

13. The device of claim 12, wherein the bit is stored in block metadata for the indirect block.

14. The device of claim 9, wherein the at least one memory and the computer program instructions are further configured to, with the at least one processor, cause the device to:
   in response to the indirect block being corrupted and the entry group being identified as recoverable, recover a data block corresponding to the entry group based on the byte pattern corresponding to the predetermined identifier.

15. The device of claim 9, wherein the predetermined identifier corresponds to a data block consisting of repeated all-zero bytes.

16. An electronic device, comprising:
at least one processor; and
at least one memory comprising computer program instructions, the at least one memory and the computer program instructions configured to, with the at least one memory, cause the device to:
   divide a plurality of entries included in an indirect block of an inode into a plurality of entry groups, each non-null entry of the plurality of entries having one of:
      a pointer pointing to an associated data block, and
      an identifier specific to a byte pattern of an associated data block;
   determine, for an entry group of the plurality of entry groups, whether entries having an identifier in the entry group all have a same predetermined identifier; and
   in response to determining that the entries having an identifier in the entry group all have the same predetermined identifier, identify the entry group as recoverable if the indirect block is corrupted;
wherein the at least one memory and the computer program instructions are further configured to, with the at least one processor, cause the device to:
   in response to an entry in the entry group being updated, update a count of entries having an identifier different from the predetermined identifier;

wherein the at least one memory and the computer program instructions are further configured to, with the at least one processor, cause the device to:
in response to the count being uninitialized and the entry having an identifier different from the predetermined identifier subsequent to updating, determine the count to be non-zero; and
in response to the count being uninitialized and the entry having the predetermined identifier subsequent to updating, scan all entries in the entry group to determine the count.

17. A computer program product having a non-transitory computer readable medium which stores a set of instructions for performing inline pattern detection operations; the set of instructions, when carried out by computerized circuitry, causing the computerized circuitry to perform a method of:
dividing a plurality of entries included in an indirect block of an inode into a plurality of entry groups, each non-null entry of the plurality of entries having one of:
a pointer pointing to an associated data block, and
an identifier specific to a byte pattern of an associated data block;
determining, for an entry group of the plurality of entry groups, whether entries having an identifier in the entry group all have a same predetermined identifier;
in response to determining that the entries having an identifier in the entry group all have the same predetermined identifier, identifying the entry group as recoverable if the indirect block is corrupted; and
in response to an entry in the entry group being updated, updating a count of entries having an identifier different from the predetermined identifier, wherein updating the count comprises at least one of:
in response to the entry having the predetermined identifier prior to updating and having an identifier different from the predetermined identifier subsequent to updating, increasing the count; and
in response to the entry having an identifier different from the predetermined identifier prior to updating and having the predetermined identifier subsequent to updating, decreasing the count.

18. The computer program product of claim 17, wherein dividing the plurality of entries into the plurality of entry groups comprises:
dividing the plurality of entries equally into the plurality of entry groups each comprising consecutive entries of the plurality of entries.

19. The computer program product of claim 17, wherein determining whether the entries having an identifier in the entry group all have the same predetermined identifier comprises:
determining, for the entry group, the count of entries; and
in response to the count being zero, determining that the entries having an identifier in the entry group all have the same predetermined identifier.

20. The computer program product of claim 17, wherein identifying the entry group as recoverable comprises:
setting a bit corresponding to the entry group to a predetermined state.

21. The computer program product of claim 17, further comprising:
in response to the indirect block being corrupted and the entry group being identified as recoverable, recovering a data block corresponding to the entry group based on the byte pattern corresponding to the predetermined identifier.

* * * * *